United States Patent [19]
Stern et al.

[11] Patent Number: 5,090,026
[45] Date of Patent: Feb. 18, 1992

[54] GMSK NARROWBAND MODEM

[75] Inventors: Harold P. Stern, Arlington, Tex.; Mohammed S. El-Tanany, Quebec, Canada

[73] Assignee: ElectroCom Automation, Inc., Arlington, Tex.

[21] Appl. No.: 405,423

[22] Filed: Sep. 11, 1989

[51] Int. Cl.⁵ .................... H04L 27/12; H04L 27/14
[52] U.S. Cl. .................................. 375/47; 375/60;
375/64; 375/90; 332/100; 329/300
[58] Field of Search .............. 375/47, 60, 64, 90;
329/300; 332/100

[56] References Cited

U.S. PATENT DOCUMENTS

| | | | |
|---|---|---|---|
| 4,500,856 | 2/1985 | Childs | 375/47 |
| 4,648,099 | 3/1987 | Kerr | 375/47 |

FOREIGN PATENT DOCUMENTS

| | | | |
|---|---|---|---|
| 0042255 | 3/1982 | Japan | 375/47 |
| 0022854 | 2/1985 | Japan | 375/47 |

OTHER PUBLICATIONS

W. A. Sulllivan, "High Capacity Microwave System for Digital Data Transmission," 7th International Conference on Communications, Jun. 14–16, 1971, pp. 23-4 to 23-8.
Nakajima et al., "Gaussion Filtered and Amplitude Limited MSK", The Transactions of the IECE of Japan, vol. E 64, No. 11, 11/81, pp. 716-723.
Daikoku et al., "High-Speed Digital Transmission Experiments in 920 MHZ Urban and Suburban Mobile Radio Channels", IEEE Transactions on Vehicular Technology, vol. VT-31, No. 2, May 1982, pp. 70-75.
James R. Cessna and Donald M. Levy, "Phase Noise and Transient Times for a Binary Quantized Digital Phase-Locked Loop in White Gaussian Noise", Apr. 1972.
Jack K. Holmes, "Performance of a First-Order Transition Sampling Digital Phase-Locked Loop Using Random-Walk Models", Apr. 1972.
"GMSK Modulation for Digital Mobile Radio Telephone", IEEE Transactions on Communications (Jul. 1981) by K. Murota & K. Hirade.
"Spectrum Efficiency of GMSK Land Mobile Radio," IEEE International Conference on Communications (1981), by K. Murota, K. Kinoshita & K. Hirade.
"GMSK Transmission Performance in Land Mobile Radio", IEEE (1983) by K. Hirade, K. Murota & M. Hata.
"Performance of CPM Using A Discriminator Based Data Detector", IEEE Int. Conference On Communications (1988) by El-Tanany & Mahmoud.
"Continuous Phase Modulation", IEEE Communications Magazine (Apr. 1986) by C. Sundberg.
(List continued on next page.)

Primary Examiner—Douglas W. Olms
Assistant Examiner—Ralph Smith
Attorney, Agent, or Firm—Harold E. Meier

[57] ABSTRACT

A GMSK modem is provided and comprises a baseband modulator section and demodulator section coupled to an FM transmitter and receiver, respectively. The Modulator section includes a digital waveform generator for generating a GMSK baseband signal from a binary digital data source. The output of the waveform generator approximates the baseband signal output of a premodulation filter with a Gaussian impulse response having a normalized noise bandwidth of between 0.25 and 0.45 in series with a gain controlled amplifer. The gain is adjusted such that the modulation index of an RF signal modulated with the baseband signal is between 0.5 and 0.7.

The demodulator section receives the analog output of a discriminator-based FM receiver with a phase equalized Butterworth IF filter. The demodulator section comprises a binary quantized loop bit timing recovery subsystem and one or the other of two data detectors. The two data detectors comprise a two-bit integrate-and-dump type filter and a two-bit multithreshold integrate-and-dump type filter. The binary quantized loop is also connected to a signal quality detector for altering the mode of operation of the loop according to the amount of noise in the baseband signal.

12 Claims, 6 Drawing Sheets

OTHER PUBLICATIONS

"Continuous Phase Modulation–Part I: Full Response Signaling", IEEE Transactions on Communications (Mar. 1981) by Auline & Sandberg.

"Continuous Phase Modulation–Part II: Partial Response Signaling", IEEE Transactions on Communications (Mar. 1981) by Auline & Sundberg.

G.E. "Voice Guard System" for Delta-SX Mobile Radios, Data Wave Communications, Inc., Radio Modem Hybrid Module, Model #MM9612.

GLB Electronics Model HSM 5 High Speed Radio Modem.

GMSK NARROWBAND MODEM

FIELD OF THE INVENTION

The invention relates to transmission of digital data with Radio Frequency (RF) signals, and more particularly to a modem for modulation by Gaussian Minimum Shift Keying (GMSK) of a binary digital signal and demodulation of a GMSK modulated baseband signal.

BACKGROUND OF THE INVENTION

Gaussian Minimum Shift Keying (GMSK) is a member of a group of digital modulation techniques known as Continuous Phase Modulation (CPM). CPM has several advantageous properties. CPM signals are spectrally compact by comparison to other well-known modulation techniques such as binary Phase Shift Keying. These signals exhibit constant envelopes, which makes such signals rather immune to power amplifier nonlinearities and less susceptible to fading. CPM signals may, in principle, be transmitted and received using modified existing FM radio technology.

In a generalized CPM transmitter, a data stream of binary pulses, (pulses assuming the values of $+1$ and $-1$) are passed through a GMSK premodulation filter. The filtered data is then applied to a gain controlled amplifier, with the output being the modulated baseband signal, and finally to a voltage controlled oscillator (VCO) with a free-running carrier frequency. The VCO produces a frequency modulated RF carrier signal centered at $f_c$, with its instantaneous frequency following the filtered baseband signal.

The advantages of CPM make it suited to transmission over mobile radio channels. Successful high-speed data transmission over a mobile radio channel requires, however, a combination of modulation parameters for which the transmission of the CPM modulated carrier signal does not exceed the FCC spectral requirements. This provides for reliable detection of the transmitted data message. Also required is a reliable means of extracting an accurate timing reference from the analog baseband signal as supplied by the FM receiver, and a reliable means of estimating the data message correctly.

Among the members of the CPM family, GMSK possesses the additional advantage of flexibility. It is actually a subclass of CPM signals. By varying parameters such as noise bandwidth of the premodulation filter, GMSK becomes almost identical to other CPM modulation schemes. For example, with a normalized noise bandwidth of 0.2, the GMSK signal is almost identical to the Tamed FM signal. A GMSK modem is thus capable of handling other CPM signals, whereas the reverse is not necessarily true.

There is, therefore, a need for a reliable GMSK-based transmission system for digital data, especially on the mobile radio channels, that meets FCC spectral requirements with minimum hardware complexity for cost-effectiveness, and yet that preserves the flexibility of a GMSK modem which can be easily adaptable to other CPM modulation schemes.

BRIEF SUMMARY OF THE INVENTION

The present invention provides a GMSK modem for use in conjunction with modified commercially available FM transmitters and receivers, that handles a wide range of modulation parameters and meets the FCC spectral requirements, all while providing reliable demodulation of the transmitted digital data.

To meet FCC spectral requirements and to reduce probability of error in the data detection portion of the demodulator section of the modem, two signal parameters, the modulation index and the normalized noise bandwidth of the premodulation filter $B_t$, must be carefully controlled. In accordance with the present invention a GMSK modulator having a modulation index of approximately 0.5 to 0.7, preferably of 0.6, and a normalized noise bandwidth of 0.25 to 0.45 at a data rate of 16 kilobits per second, preferably of 0.3, gives the least probability of error in detecting the transmitted symbol, and meets FCC spectral requirements.

The GMSK premodulation filter receives digital data in NRZ (nonreturn to zero) format from an external digital data source, such as a digital voice processor. The premodulation filter is implemented using a waveform generator having a look-up table and a digital-to-analog converter. This permits the flexibility of reprogramming or programming additional sets of waveforms having different GMSK modulation parameters h and $B_t$.

The output of the waveform generator replicates the baseband signal output of a premodulation filter with a Gaussian impulse response having a normalized noise bandwidth of between 0.25 and 0.45 in series with a gain controlled amplifier, the gain is adjusted such that the modulation index of an RF signal is between 0.5 and 0.7.

The demodulator section receives the analog output of a discriminator-based FM receiver with either a nonequalized radio frequency filter or a phase equalized Butterworth IF filter. The demodulator section comprises a binary quantized loop bit timing recovery subsystem and a data detector. The data detector comprises either a two-bit integrate-and-dump type filter, or, alternatively, a two-bit multithreshold integrate-and-dump type filter. The binary quantized loop is also connected to a signal quality detector for altering the mode of operation of the loop according to the amount of noise in the received baseband signal.

DETAILED DESCRIPTION OF THE DRAWINGS

The GMSK modem consists of two subsystems: a modulator and a demodulator. The modulator accepts pulses of digital data (Tx Data) and transforms the data into an analog waveform for transmission to a remote receiver. The output of modulator subsystem is a GMSK modulated baseband signal, which is applied to the input of a voltage controlled oscillator within a FM transmitter, usually through the dc input of the transmitter. The demodulator receives and demodulates an analog GMSK-modulated baseband signal from a FM receiver by estimating the data values, or symbols, which were transmitted. FIGS. 1-11 are diagrams of the modem, various systems and subsystems thereof, and a discriminator-based FM receiver. The FM transmitter is not shown. A commercially available FM receiver and transmitter may be used with the modem with, for improved bit error rate (BER) performance, modifications to the IF filter of the FM receiver.

Figure 1:
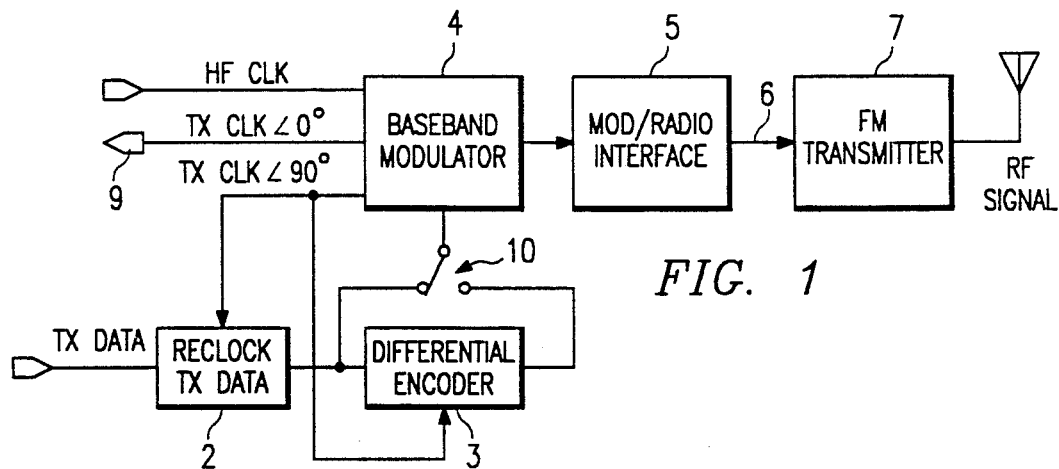
FIG. 1 is a block diagram of the GMSK modulator.

FIG. 1 is a block representation of the modulator system of the GMSK modem. The modulator has two inputs, the first receiving the Tx Data in NRZ format at a rate of 16 kilobits per second, and the second receives a crystal stabilized high frequency reference clock signal (HF CLK) operating, in the preferred embodiment at 512 kHz. The second input is applied to the input of a baseband modulator 4. One output of baseband modulator 4 is a transmit data clock signal with phase angle zero (Tx CLK $<0°$) that is coupled to the external NRZ data source in order to generate the correct timing for the Tx Data appearing at the input of a reclock Tx Data module 2. Modulator/radio interface 5 couples the GMSK modulated baseband signal from baseband modulator 4 to the dc input of a FM transmitter 7. The modulator/radio interface 5 matches the dc levels and the impedances of the modulator and FM transmitter 7, and provides adjustment for peak-to-peak signal levels of the GMSK modulated baseband signal. The modulator/radio interface 5 is adjustable in order to facilitate interfacing the modulator.

Figure 2:
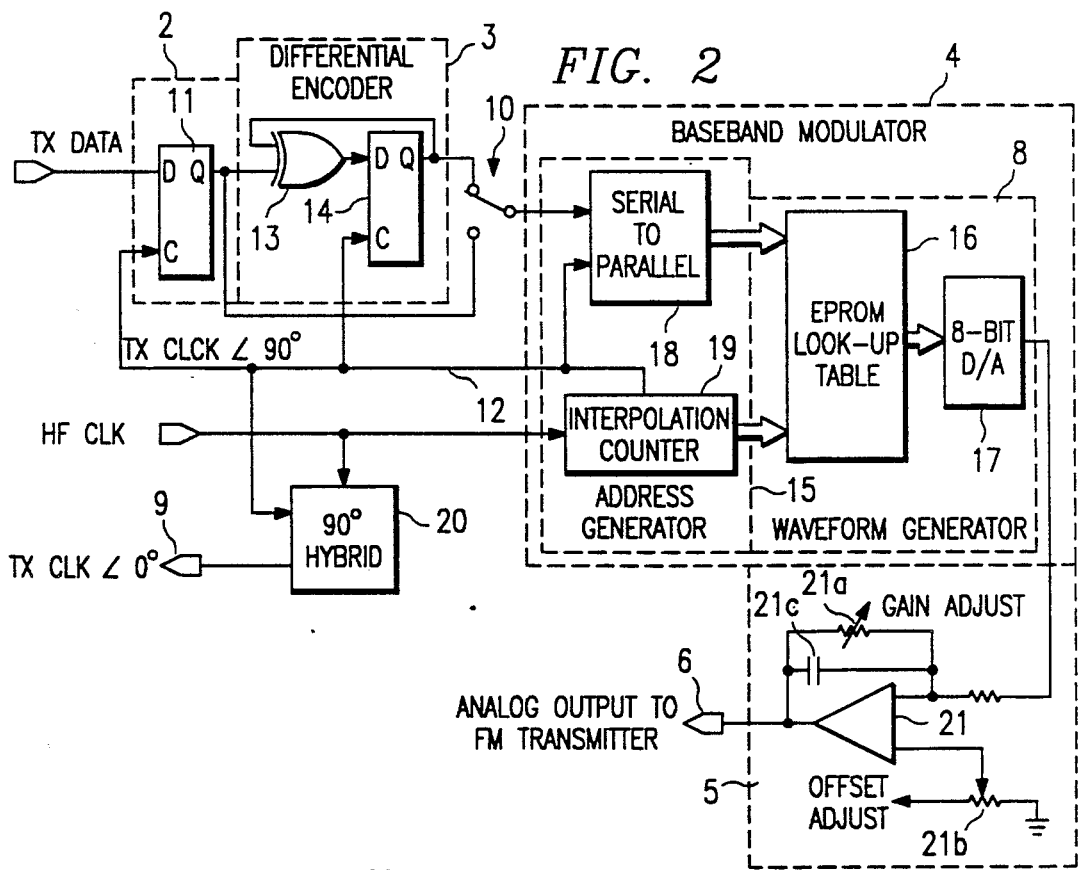
FIG. 2 is a block diagram of the GMSK baseband modulator.

As shown in FIG. 2, the Tx Data that appears on the input to the Tx Data module 2 is reclocked by means of a D-type flip-flop 11 in accordance with a clock from the in-phase quadrature signal of the Tx Clock (Tx CLK $<90°$) on line 12. By reclocking, the baseband modulator accommodates both positive and negative edge triggered data sources. Switch 10, shown in FIGS. 1 and 2, is set to determine whether the reclocked Tx Data is to be differentially encoded by a differential encoder 3. Differential encoder 3, as shown in FIG. 2, is comprised of an EXCLUSIVE OR gate 13 and a D-type flip-flop 14. The D-type flip-flop 14 is clocked by the Tx Clock at 90°. Either the reclocked Tx Data appearing at the Q output of the D-type flip-flop 11 or the differentially encoded Tx Data appearing on the Q output of D flip-flop 14 is connected by means of the switch 10 to an address generator 15.

As shown in FIG. 2, the address generator 15 connects to a waveform generator 8 comprising an EPROM look-up table 16, which may also be a RAM, a ROM or any equivalent memory device, and an eight-bit digital-to-analog converter 17. The waveform generator 8 is a functional equivalent to a Gaussian premodulation filter of the type earlier described. The EPROM look-up table 16 stores eight-bit digital words that are the digitized analog output of a Gaussian premodulation filter in response to the stream of binary pulses that comprise the TX Data. The address generator 15 supplies the address of the eight-bit digital word to be clocked out of the EPROM, and the eight-bit digital-to-analog converter 17 converts the digital word to a voltage signal. By addressing and clocking out these eight-bit digital words at a much higher frequency than the Tx Clock, the analog output of a Gaussian premodulation filter is reconstructed.

The number of eight-bit words needed to accurately regenerate the analog waveform of the output of a Gaussian premodulation filter in response to one bit of Tx Data is a compromise between the size of the EPROM and the requirements for post digital-to-analog converter filtering. In the preferred embodiment, thirty-two samples per bit are chosen to allow for "loose" analog filters in the modulator circuitry, permitting the modulator to be applicable to other data rates by simply changing the HF reference clock to be 32R kHz, where R is any other data rate in kilobits per second.

Typically, the impulse response of a Gaussian premodulation filter decays over a period lasting several bit periods. The data values of a plurality of Tx Data bits are, therefore, necessary to generate the analog waveform for the Tx Data bit-of-interest. Thus, the minimum size of the EPROM becomes $2^{L+M}$ bytes, a byte being equal to eight bits, where L is the number of data bits to which the impulse response of the Gaussian premodulation filter is truncated, and $M=\log_2 X$, where X is the number of eight-bit words to form one analog waveform per bit period. In the preferred embodiment, the impulse response is truncated to a period equal to five bit Tx Data periods. The EPROM, at minimum, must therefore store $2^{10}$ bytes for a complete set of thirty analog waveforms with thirty-two bytes per waveform, requiring a ten-bit address to address each eight-bit word. With a larger EPROM, however, more than one complete set of digitized analog waveforms can be stored, permitting the instantaneous selection of waveforms with different GMSK modulation parameters. An INTEL 2764 CMOS EPROM has the capacity to store 8 different versions of GMSK waveform sets, each set containing 1024 samples, sufficient for the generation of GMSK with a selected $B_t$.

The five most significant bits of the ten-bit address for the EPROM look-up table are comprised, in order of significance, of the the previous two Tx Data bits, the Tx Data bit-of-interest and the values of the two upcoming Tx Data bits. The five least significant bits are the address locations of each of the eight-bit word samples necessary to accurately represent the analog waveform corresponding to the five most significant bits.

The address generator 15 is illustrated in FIG. 2 as including a serial-to-parallel converter 18 using a serial in/parallel out eight-bit converter for the five most significant bits, and a interpolation counter 19 realizable as a five-stage binary counter with the five Q outputs supplying the five least significant bits of the address. The HF reference clock (HF CLK) steps the interpolation counter 19 from zero to thirty-one, thereby sequentially addressing the thirty-two samples for the waveform corresponding to the five most significant bits, at which time the counter is reset and a carryover bit generates the Tx Clock at 90° on line 12. The Tx Clock at 90° reclocks Tx Data by means of the D-type flip-flop 11, clocks differential encoder 3 and clocks the serial-to-parallel interface 18. In order to generate the Tx Clock at 0° the Tx Clock at 90° is converted using a 90° hybrid circuit 20.

Connected to the EPROM look up table 16 is an eight-bit digital-to-analog converter 17 that converts each of the samples clocked out of the EPROM to a representative voltage so as to generate a GMSK analog waveform from the thirty-two samples. The output of the eight-bit digital-to-analog converter 17 may be, if necessary, filtered by a post-digital-to-analog filter and applied to modulator/radio interface 5. The modulator/radio interface 5 includes an operational amplifier 21 operating as a buffer for dc level matching between the baseband modulator 4 and the FM transmitter 7, and for signal level variation. A gain adjust 21a in a feedback loop for operational amplifier 21 controls ac gain, by which the modulation index is also controlled, and an offset adjust 21b controls the dc level shifting. The modulator/radio interface 5 also includes an integrator capacitor 21c and functions as a single-pole, low pass filter to suppress higher order harmonics in the analog signal from the eight-bit digital-to-analog converter 17. The output on line 6 of operational amplifier 21 connects to the dc input of the FM transmitter 7, specifically to a voltage controlled oscillator (VCO) in the FM transmitter to frequency modulate the RF carrier signal.

The waveform generator 8 may, if desired, be replaced with a Gaussian premodulation filter of the type earlier described, the Gaussian premodulation filter being a functional equivalent. The waveform generator 8 has the advantage, however, of being easily reprogrammed to have a different impulse response function, or, programmed with more than one impulse response.

Figure 3:
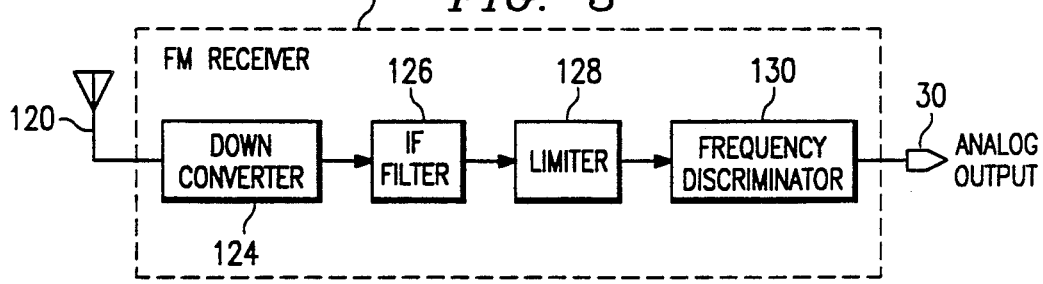
FIG. 3 is a block diagram of a discriminator-based FM receiver.

As shown in FIG. 3, a FM receiver 122 responds to an input as received from the system of FIG. 1. The RF carrier signal received on antenna 120 is down-converted by means of a down-converter 124 to an intermediate frequency (IF) signal, either in one or more stages. The IF signal is then filtered by an IF filter 126—at each stage if there is more than one stage—and applied to a limiter 128. The output of limiter 128 is applied to a frequency discriminator 130 having an output that is the analog output signal of the RF receiver and is fed to the demodulator of FIG. 4 on line 30.

BER performance depends in part on the ability of the IF filter to reject and thereby provide protection against interference from adjacent channels. Rejection often depends on the order of the filter used; the higher the order the greater the rejection. However, the higher the order of the filter, the greater the group delay distortion associated with the filter, resulting in the component frequencies of the IF signal being delayed at different rates by the filter. Group delay also adversely affects BER performance. The IF filter 126 (or filters), therefore, are carefully chosen to give optimum BER performance. The present invention calls for the GMSK modem to be used in combination with an IF filter 126 (or filters) having a fourth or sixth order, phase-equalized Butterworth impulse response and a normalized noise bandwidth of 1.0 for the best BER performance.

Figure 4:
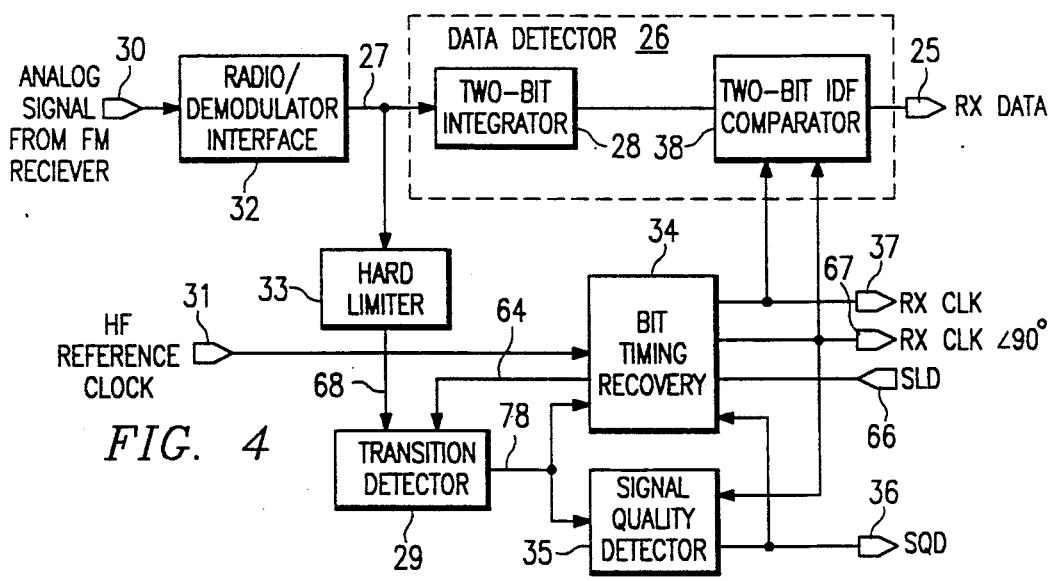
FIG. 4 is a block diagram of the GMSK demodulator having a two-bit integrator and a two-bit IDF comparator as a data detector.

Referring to FIG. 4, there is shown a diagram of the demodulator section of the GMSK modem having two inputs. On line 30 is the analog output signal of the FM receiver of FIG. 3; on line 31 is the second input a high frequency reference clock (HF Reference clock) signal.

The analog output signal of the FM receiver is passed through a radio/demodulator interface circuit 32 to match the dc levels and impedances, if necessary, of the FM receiver and the demodulator circuit. The interface circuit 32 may be realized as a variable gain summing amplifier with one of the summing inputs being used to adjust for dc level variations. The filtered analog signal on line 27 from the FM receiver comprises the GMSK baseband signal if a good quality frequency modulated RF signal has been received and demodulated.

The baseband signal on line 27 is applied to a data detector 26. From the baseband signal, the data detector 26 estimates the transmitted symbol, that is, the binary value of the Tx Data bit. The data detector 26 includes a two-bit integrate-and-dump filter (two-bit IDF) consisting of a two-bit integrator 28 and a two-bit IDF Comparator 28.

Figure 5:
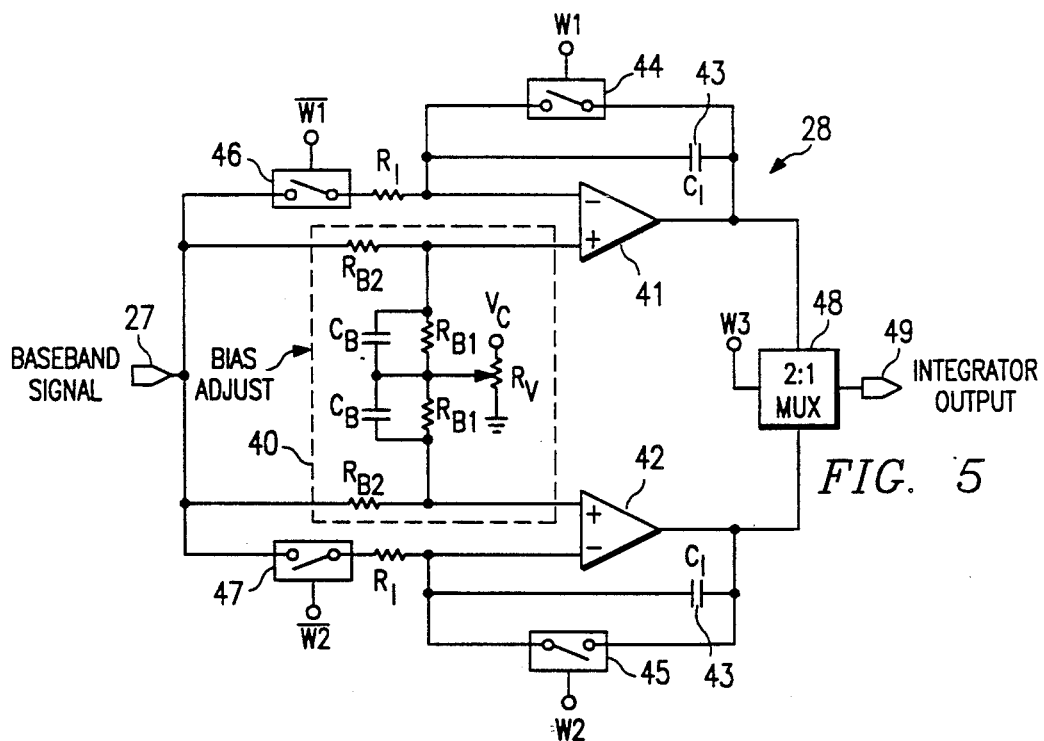
FIG. 5 is a functional schematic of a two-bit integrator for use in the data detector of FIG. 4.

A schematic diagram of the two-bit integrator 28 is shown in FIG. 5. The two-bit integrator has two integrators arranged in parallel and connected to the GMSK baseband signal on line 27. Integrator number one is comprised of an operational amplifier 41 and integrator number two is comprised of operational amplifier 42. Connected to each of the operational amplifiers 41 and 42 is a feedback capacitor 43 and an input resistor $R_I$. The time constant of each integrator is determined by the input resistor $R_I$, connected between the baseband signal and the inverting input of the operational amplifier, and the feedback capacitor 43, connected between the inverting input and the output of the operational amplifier. The values of the feedback capacitor 43 and the input resistor $R_I$ to each of the amplifiers 41 and 42 are chosen such that the time constant is approximately equal to one Tx Data bit period. The integrator is "dumped" using CMOS switch 44 for integrator number one and CMOS switch 45 for integrator number two. Each switch is connected across the respective feedback capacitor 43. The GMSK baseband signal on line 27 is connected to integrator number one and number two through CMOS switches 46 and 47, respectively.

Each integrator integrates over a two-bit period. Integrator number one begins to integrate at t=0, and integrator number two begins to integrate at t=T, where equals the Tx Data bit period. The integration continues over successive two-bit periods, each integration period staggered with respect to the other by one-bit period.

Figure 6:
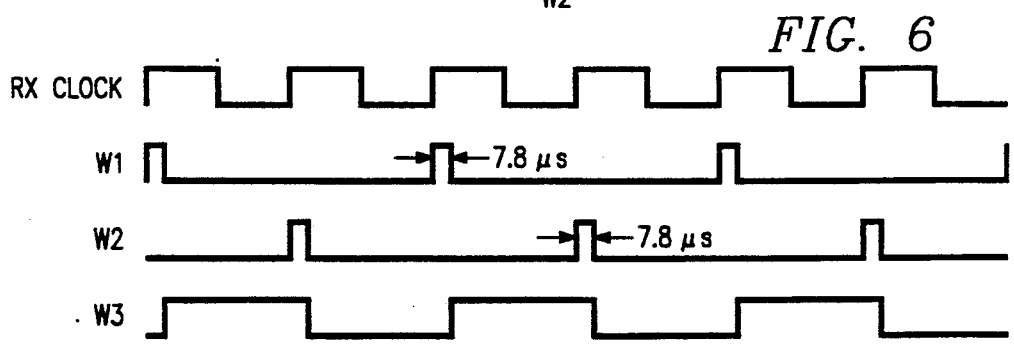
FIG. 6 is a diagram showing the waveforms and timing of the control signals for the two-bit integrator.

Referring to FIG. 6, the signal represented by the waveform W1 is applied to CMOS switch 44 to dump the charge on feedback capacitor 43 at the end of each period of integration for integrator one. The complement of the signal represented by W1 is applied to the CMOS switch 46 which opens to disconnect the line 27 for 7.8 microseconds to enable dumping the charge from the capacitor 43. The signal represented by the waveform W2 and its complement control in a similar manner the operation of CMOS switches 45 and 47 for integrator number two. Waveforms W1 and W2 and their complements operate, as shown in FIG. 6, in synchronization with the receiver clock signal (Rx CLK). Any suitable circuitry may be used for generating the waveforms W1, W2 and their complements.

Referring again to FIG. 5, the inverting inputs of operational amplifiers 41 and 42 are each connected to a bias adjust circuit 40. For each integrator, a resistor $R_{B2}$ is connected between line 27 and the non-inverting inputs of operational amplifiers 41 and 42. Also connected between the non-inverting inputs of each operational amplifier and a variable reference voltage is a voltage divider circuit having capacitor $C_B$ and resistor $R_{B1}$ connected in parallel. The bias is adjusted by means of variable resistor $R_v$ so that the output of each integrator fully swings and is symmetrical about its mean or dc level.

The output of each integrator is multiplexed by a 2-to-1 multiplexor 48. The control signal for the multiplexor 48 is represented by the waveform W3, as shown in FIG. 6, and operates in synchronization with the Rx CLK to provide, alternately, the output of each integrator during the second half of its integration period to the data comparator 38.

Figure 7:
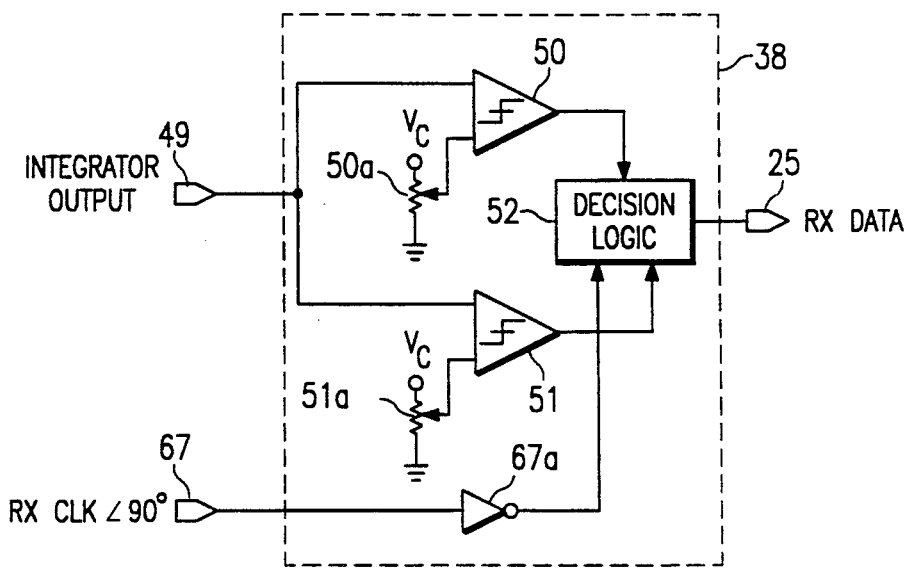
FIG. 7 is a schematic of the comparator section of the data detector of the two-bit integrate-and-dump filter.

The output on line 49 of the 2-to-1 multiplexor 48 is connected, as shown in FIG. 7, to the comparator section of the two-bit IDF comparator 38. The two-bit IDF comparator 38 includes two voltage comparators 50 and 51 connected in parallel to the first output of the multiplexor 48 and to adjustable threshold resistors 50a and 51a, respectively. The threshold voltages set by the resistors 50a and 51a are equally spaced in different directions from the mean value (dc level) of the outputs of the integrator such that, at the time of a comparison, the voltage at the output of the two-bit integrator is: (1) higher than both thresholds, indicating that the detected binary values of the data bit in a question is $-1$; (2) between the two thresholds, indicating that the detected binary value of the data bit in question is $+1$; or (3) less than both thresholds, indicating the value of the bit is $-1$. The threshold voltages are adjustable in order to facilitate interfacing the modem to different FM receivers and to different data rates.

The outputs of the comparators amplifiers 50 and 51 are connected to decision logic 52 for deciding what symbol was transmitted. The decision logic consists of an EXCLUSIVE OR gate connected to the output of the two comparator amplifiers 50 and 51, with the output of the EXCLUSIVE OR gate connected to a D flip-flop. The Q output of the D flip-flop is the received data (Rx Data) and appears on output line 25. To accommodate the time lag induced by the two-bit integrator, the D flip-flop is clocked by the inverse Rx Clock at 90°, so that the comparison is made when the output of the integrator has reached the point of full swing. The inverse of the Rx Clock at 90° is generated at the output of an inverter amplifier 67a connected to the decision logic 52.

Figure 8:
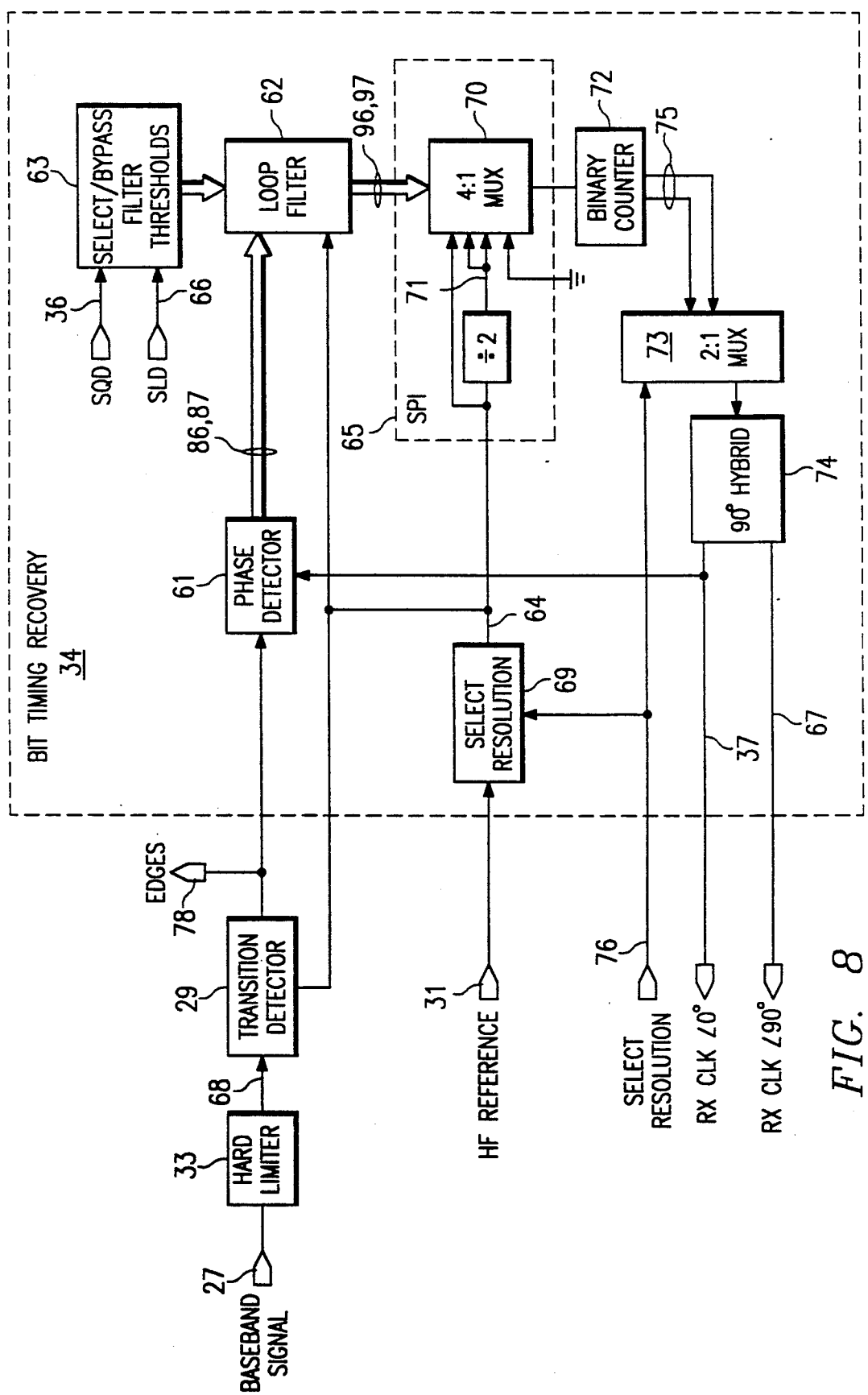
FIG. 8 is a block diagram for the bit timing recovery subsystem with a binary quantized loop.

Referring again to FIG. 4 and to also FIG. 8, a bit timing recovery (BTR) subsystem 34 includes a binary quantized loop, shown in FIG. 8, and performs the task of generating the phase-aligned Rx Clock (Rx CLK) signal on line 37 for the data detector 26. The baseband signal on line 27 (see FIG. 4) is applied to a hard limiter 33, comprising a comparator with a threshold voltage adjustable to the dc level of the baseband signal. The output is a two level voltage signal referred to as RAW DATA and appears on line 68. In the absence of noise from the FM receiver 122 (see FIG. 3) on line 30, a transition of the RAW DATA voltage level indicates a data bit transition in the baseband signal. The RAW DATA voltage is applied to a transition detector 29 and from the transition detector to a phase detector 61 as a part of the Bit Timing Recovery 34. The phase detector 61 determines the timing of the data bit transitions in the baseband signal with respect to the Rx Clock. The output of the transition detector 29 is also coupled to a signal quality detector 35, FIG. 4, by line 78.

Figure 9:
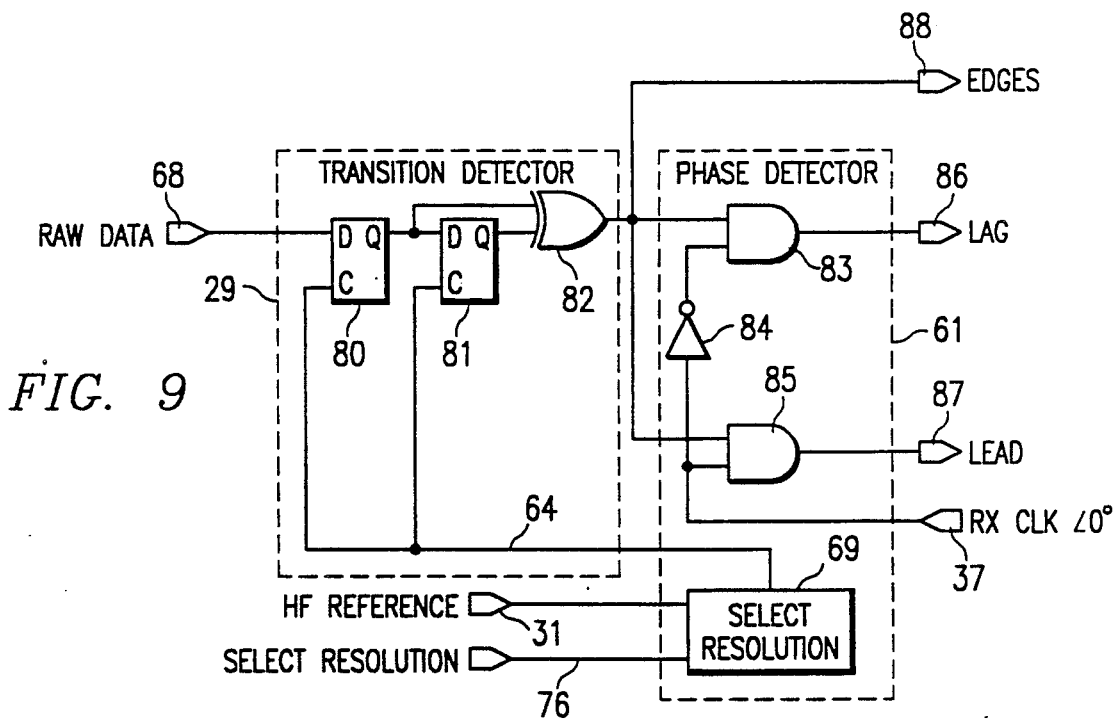
FIG. 9 is a schematic of the transition detector and the phase detector of the bit timing recovery subsystem.

Referring now to FIG. 9, there is shown a schematic of transition detector 29 and the phase detector 61. The transition detector receives the RAW DATA voltage on line 68 at the D input of D-type flip-flop 80. The Q output of D flip-flop 80 is connected to the D input of a second D-type flip-flop 81 and to one input of an EXCLUSIVE OR gate 82. The Q output of flip-flop 81 is connected to the other input of EXCLUSIVE OR gate 82. The D flip-flops 80 and 81 act to create successive time windows. A change in the voltage level of the RAW DATA voltage from one window to the next is registered as a pulse on the output of the EXCLUSIVE OR gate 82.

Flip-flops 80 and 81 are clocked by the loop clock signal on line 64. To generate the loop clock signal, a select resolution circuit 69 (see FIGS. 8 and 9) acts as a frequency divider that divides, for low resolution, the HF Reference clock signal on line 31 by two, with the output being the loop clock signal on line 64. At high resolution, the HF Reference clock signal is not divided and provided directly to line 64. The selection of low resolution or high resolution is controlled by the Select Resolution signal on line 76. With a higher frequency loop clock signal on line 64, the edges of windows are closer together, thus giving greater resolution. Smaller differences in the phase alignment are thus detectable, permitting closer phase alignment. A higher resolution, however, means that the BTR subsystem will respond more slowly to large differences in the phase as the corrections to the phase alignment must be made in smaller increments. A lower resolution is, therefore, preferred when the baseband signal is first acquired in order to more quickly acquire the proper phase alignment. Once the initial phase alignment is acquired, the resolution is switched to the higher level to tolerate better short fades in the baseband signal. With high resolution, data bit transitions in the baseband signal are more quickly detected before the baseband signal fades. A data bit transition immediately before a fade is more likely to be detected with high resolution than with low resolution, and therefore not lost.

Returning to FIG. 9, the output of the EXCLUSIVE OR gate 82 is normally low, until at data bit transition in the RAW DATA voltage on line 68 is detected. When a data bit transition is detected, the output of the EXCLUSIVE OR gate 82 generates a positive pulse having a width inversely proportional to the frequency of the loop clock signal on line 64. The output on line 78 of the transition detector 29 looks, therefore, like a train of pulses, each pulse being called an "EDGE".

These "EDGE" pulses are applied via line 78 to the phase detector 61 shown in FIG. 8 and in FIG. 9. As shown in FIG. 9, the phase detector 61 comprises AND gates 83 and 85 The EDGE pulses are applied to one input of each AND gate. The Rx Clock signal on line 37 is applied to the second input of AND gate 85 and the inverse of the Rx Clock signal is applied to the second input of AND gate 83 through an inverter amplifier 84. The outputs of the AND gates 83 and 85 on lines 86 and 87 are normally low. When an EDGE occurs within the positive half cycle of Rx Clock, the output on line 87 of AND gate 85 goes high for the duration of the EDGE while the output on line 86 of AND gate 83 remains low, thus indicating that the low to high transition, or zero phase, of the Rx Clock signal "LEADS" behind the edges of the data bit transitions of the baseband signal. Similarly, if the EDGE occurs in the negative half of Rx Clock signal, the output on line 86 will go high for the duration of the EDGE, while the output on line 87 remains low, thus indicating that the low to high transition of the Rx Clock signal "LAGS" the EDGE of the data bit transitions in the baseband signal.

Figure 10:
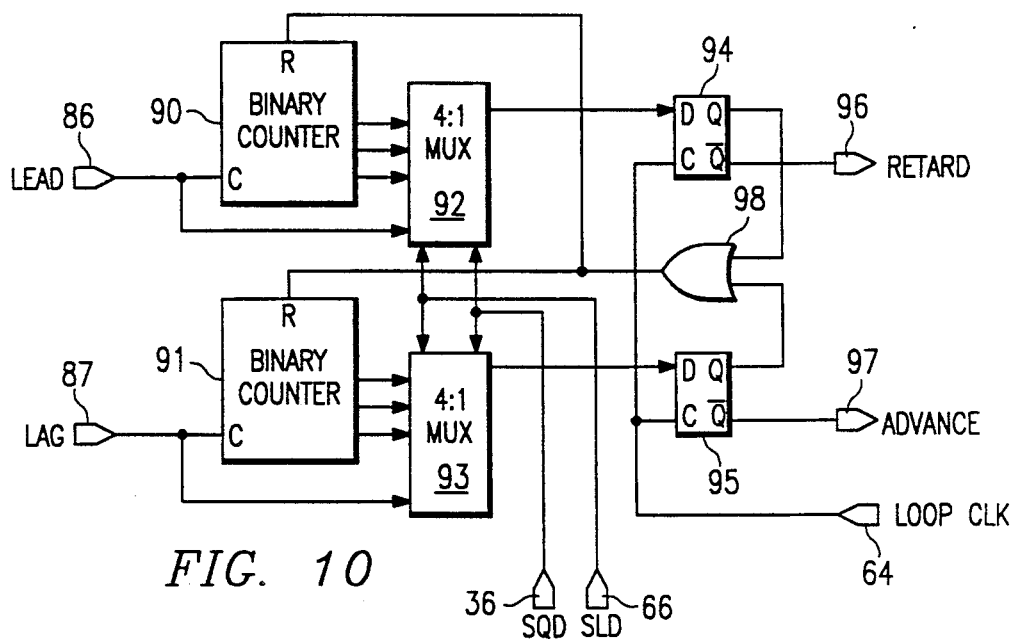
FIG. 10 is a schematic of the loop filter of the bit timing recovery system.

Referring now to FIG. 8 and to FIG. 10, outputs on line 86 and 87 of the AND gates 83 and 85 are applied to the loop filter 62 to count the LAG and LEAD pulses appearing on the output lines 86 and 87. Loop Filter 62 consists of two binary counters, for example, two twelve stage counters. Binary counter 90 counts the LEAD pulses and binary counter 91 counts the LAG pulses. The counters "race" each other until one reaches a selected threshold number. The threshold number is selected by choosing a particular Q output of each binary counter 90 and 91. For example, the Q5 output is chosen for a threshold of $2^5$; the first binary counter with the Q5 output going high being the first to reach the threshold. In this example, the Q5 output of each binary counter is connected to an OR gate having an output connected to the Reset terminal of each binary counter so that the binary counters are automatically reset upon one or both counters reaching the threshold number. A pulse having a width proportional to the period of the loop clock signal appears on the appropriate output line when one counter reaches the threshold number. A pulse on line 96 indicates that the Rx Clock 37 is leading the data bit transitions in the baseband signal and therefore requiring that the phase be corrected by retarding the phase of the Rx Clock some predetermined amount. A pulse on line 97 indicates that the phase of the Rx Clock 37 is lagging and should be corrected by advancing the phase.

In one embodiment, the thresholds are made selectable with a pair of 4-to-1 multiplexors (4:1 MUXs) 92 and 93 as a part of the Select/Bypass Threshold Circuit 63 of FIG. 8. Three of the Q outputs of the respective counter 90 or 91 are connected to inputs of one of the 4:1 MUXs—multiplexor 92 for binary counter 90, and multiplexor 93 for binary counter 91. For the illustrated embodiment, Q2, Q5 and Q12, corresponding to thresholds of $2^2$, $2^5$ and $2^{12}$, are connected from each binary counter to the respective multiplexor. The fourth input to 4:1 MUX 92 is the LEAD input 86 and the LAG input 87 is the fourth input for the multiplexor 93.

Referring to FIG. 4, the control signals for both multiplexors 92 and 93 are the signals on line 36 of the signal quality detector (SQD) 35 and a level detector (SLD) signal on line 66. The circuit for generating the SLD signal on line 66 is a standard component of commercially available FM receivers, and need only have a two-level output. The two multiplexors may be replaced with a dual 4:1 MUX with shared control lines 36 and 66. Each 4:1 MUX must be wired so that the same threshold is chosen with the same control signal on lines 36 and 66.

Once the threshold number is reached by one of the binary counters 90 and 91, the output of the 4:1 MUX connected to the binary counter generates a pulse. Connected to the output of multiplexors 92 and 93 are the D inputs of D flip-flops 94 and 95, respectively, to receive the output of the multiplexors. The Q outputs of D flip-flops 94 and 95 form the inputs to OR gate 98. The output of OR gate 98 is connected to the RESET input on both binary counters 90 and 91. The D flip-flops 94 and 95 ensure that the pulse used to reset the binary counters 90 and 91 has a fixed width. The Q complement output of the two D flip-flops are connected by, respectively, command lines 96 (RETARD) and 97 (ADVANCE) to the Select Phase Increment (SI) circuit 65 shown in FIG. 8. The RETARD line 96 and the ADVANCE line 97 remain high until binary counter 90 or 91 reach the threshold number, at which time the appropriate RETARD or ADVANCE line, or both, go low.

Referring to FIG. 8, the SPI circuit 65 increments and decrements the phase of the Rx Clock. The loop clock signal on line 64 is connected through the SPI circuit 65 to the clock input of a binary counter 72, which acts as a frequency divider with the Rx Clock connected to one of the Q outputs. In one embodiment, the HF Reference clock signal has a frequency of 128×16 kHz or 128 times the desired Rx Clock frequency of 16 kHz, the same rate at which the Tx Data, 16 kB/sec, modulates the GMSK baseband signal. The phase of the Rx Clock, with respect to the baseband signal, is advanced and retarded by adding a loop clock signal pulse to the clock input of binary counter 72 for a lagging Rx Clock, or deleting a loop clock signal pulse from the clock input of binary counter 72 for a leading Rx Clock.

The addition and deletion of pulses to the clock input of binary counter 72 is accomplished in the SPI circuit 65 by a four-to-one multiplexor (4:1 MUX) 70. The loop clock signal on line 64 is connected to one input of the 4:1 MUX. The loop clock signal divided by two on line 71 is connected to two inputs of the 4:1 MUX, and a fourth input is connected to ground. When both the RETARD and ADVANCE command lines 96 and 97 are high, the loop clock signal divided by two on line 71 is connected through 4:1 MUX 70 to binary counter 72 such that the binary counter counts at the rate equal to the frequency of the loop clock signal divided by two. Similarly, when both the RETARD and ADVANCE lines 96 and 97 go low simultaneously, indicating that it is equally likely that the phase of Rx Clock on line 37 is leading or lagging the baseband signal on line 27, the 4:1 MUX 70 connects the divided loop clock signal on line 71 to the binary counter 72. When the ADVANCE line 97 goes low, however, the undivided loop clock signal on line 64 is connected through 4:1 MUX 70 to binary counter 72, thereby causing the binary counter to count twice as fast for the duration of one period of the loop clock signal. One additional pulse is, thereby, "added" to the binary counter 72. The result is an Rx Clock whose phase is advanced such that the lag of the zero phase is reduced with reference to the data bit transitions in the baseband signal. Similarly, when the RETARD line 96 goes low, the output of the binary counter 72 is deleted by a count as a result of the 4:1 MUX connecting the ground line to the binary counter 72 for one period of the loop clock signal on line 64 and the divided loop clock signal on line 71 cannot clock the binary counter for one loop clock period. The phase of the Rx Clock will thereby be retarded so that it does not lead, by as much, the baseband signal.

In order to keep the Rx Clock at a constant frequency and yet permit the resolution of the transition detector 29 to be changed by select resolution circuit 69, a two-to-one multiplexor (2:1 MUX) 73, shown in FIG. 8, connects to two of the Q outputs of the binary counter 72. In one embodiment, the Q6 output of binary counter 72 is taken for the Rx Clock when the resolution of the selection resolution circuit is high, and the Q5 output when resolution is low. The output of the 2:1 MUX 73 is connected to 90° hybrid circuit 74, which generates the Rx Clock at 90° on line 67 and the Rx Clock on line 37.

Having selectable threshold levels for the loop filter 62 permits the binary quantized loop to run in several different modes of operation depending on the output of the signal quality detector (SQD) 35 and the signal level detector (SLD) signal on line 66. The SQD output on line 36 is a two level signal that indicates the relative quality of the baseband signal by the percentage of RAW DATA level transitions due to noise, out of the total number of RAW DATA level transition. If this percentage exceeds a predetermined threshold, this is an indication of an unacceptable amount of noise in the analog output of the FM receiver. The SLD signal on line 66 indicates the relative strength of the RF signal received by the FM receiver.

Figure 11:
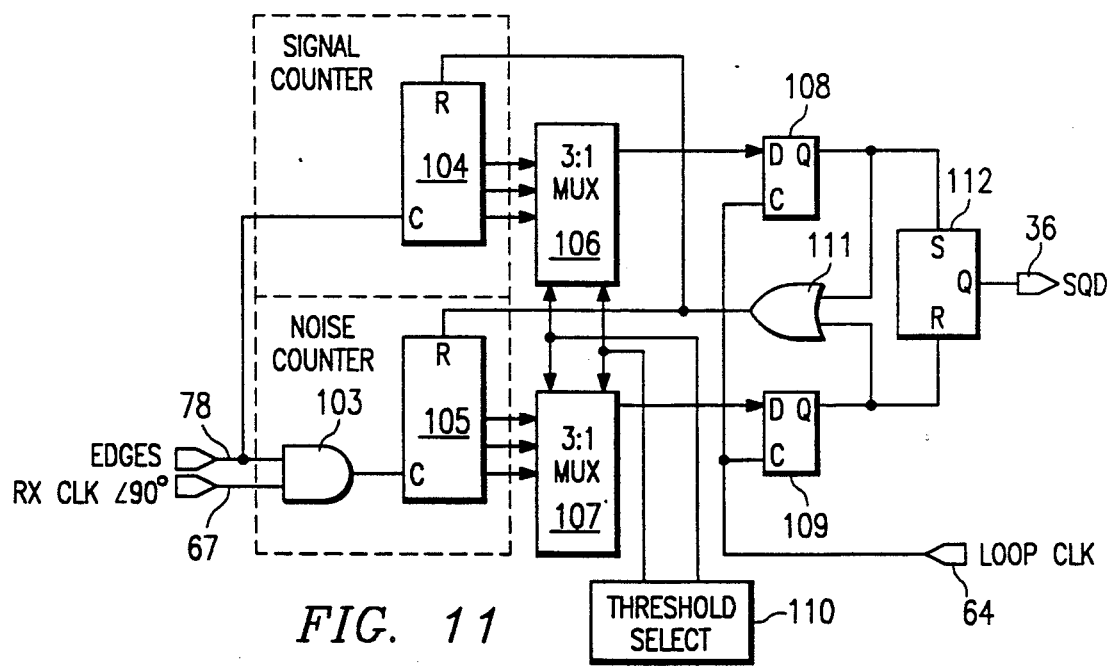
FIG. 11 is a schematic of the signal quality detector.

Referring to FIG. 11, there is shown a schematic of the signal quality detector 35. The signal quality detector operates on the principle that EDGEs on line 78 that occur in the positive half cycle of Rx Clock at 90° are not likely due to data bit transitions in the baseband signal, but are more likely due to noise in the baseband signal. The signal quality detector 35, therefore, counts all EDGEs on line 78, as applied to a binary counter 104, in addition to counting EDGEs on line 78 as applied to a binary counter 105, occurring in the positive half cycle of Rx Clock at 90°, and calculates, in effect, a percentage of EDGEs due to noise. Binary counter 104 counts all EDGEs, and binary counter 105 counts EDGEs which occur when the Rx Clock at 90° is in its positive half-cycle. This selective counting results from ANDing by means of a AND gate 103 the EDGEs on line 78 and the Rx Clock 90° signal on line 67. The two binary counters 104 and 105 "race" until one reaches a preselected threshold number, at which time both binary counters are reset.

Unlike the loop filter 62 of FIG. 10, each binary counter has a different threshold number. In one embodiment, the threshold value of binary counter 105, which counts the EDGEs due to noise, is one-eighth of the threshold value of binary counter 104. Threshold numbers chosen on this basis would indicate that the bit error rate of the data detector 38 is somewhere in the vicinity of ten percent, which is an adequate value for declaring that the baseband signal on line 27 has dropped out. If, therefore, binary counter 105 reaches its threshold first, the bit error rate is probably greater than ten percent. If binary counter 104 reaches its threshold first, the bit error rate is probably less than ten percent. In one embodiment, the binary counters 104 and 105 are 12-stage counters. The thresholds are selected by connecting to certain Q outputs from each binary counter, such as the Q9 output from binary counter 104 and the Q6 output from binary counter 105.

The thresholds may, if desired, be changed by connecting more than one Q output from each binary counter 104 and 105 to the respective multiplexor 106 or 107. In one embodiment, three-to-one multiplexors (3:1 MUX) 106 and 107 are each connected to three Q outputs of the respective binary counter. For example, the Q7, Q9 and Q12 outputs of the binary counter 104 are connected to the inputs of 3:1 MUX 106; and the Q4, Q6 and Q9 outputs of binary counter 105 are connected to the inputs of 3:1 MUX 107. A threshold select circuit 110 controls the selection of the inputs to the 3:1 MUXs such that, for example, Q7 of binary counter 104 and Q5 of binary counter 105 are always chosen together for connecting to the 3:1 MUX 106 and 107, respectively.

The outputs of 3:1 MUX 106 and 3:1 MUX 107 are connected, respectively, to the D inputs of D flip-flops 108 and 109. The Q outputs of the D flip-flops 108 and 109 are ORed together by an OR gate 111, having an output connected to the Reset terminals of both binary counters 104 and 105. When either counter reaches its preselected threshold, both counters are automatically reset by a pulse on the output of the OR gate 111.

The D flip-flops 108 and 109 generate a fixed width pulse for resetting the binary counters 104 and 105. This same fixed width pulse at the Q output of D flip-flop 108 is also connected to the "S" or "set" input of S/R flip-flop 112, and the Q output of D flip-flop 109 is also connected to the "R" or "reset" input of S/R flip-flop 112. D flip-flops 108 and 109 ensure that both the S and R inputs of S/R flip-flop 112 do not go low simultaneously. The Q output of S/R flip-flop 112 is high if binary counter 105, which counts EDGEs due to noise, never reaches its threshold first. Once binary counter 105 reaches its threshold first, S/R flip-flop 112 is reset such that its Q output goes low, thus indicating that the baseband signal on line 27 has dropped out. The Q output of S/R flip-flop 112 will remain low until it is set by binary counter 104 reaching its threshold first, thus indicating the reacquisition of a good quality baseband signal on line 27.

Figure 12:
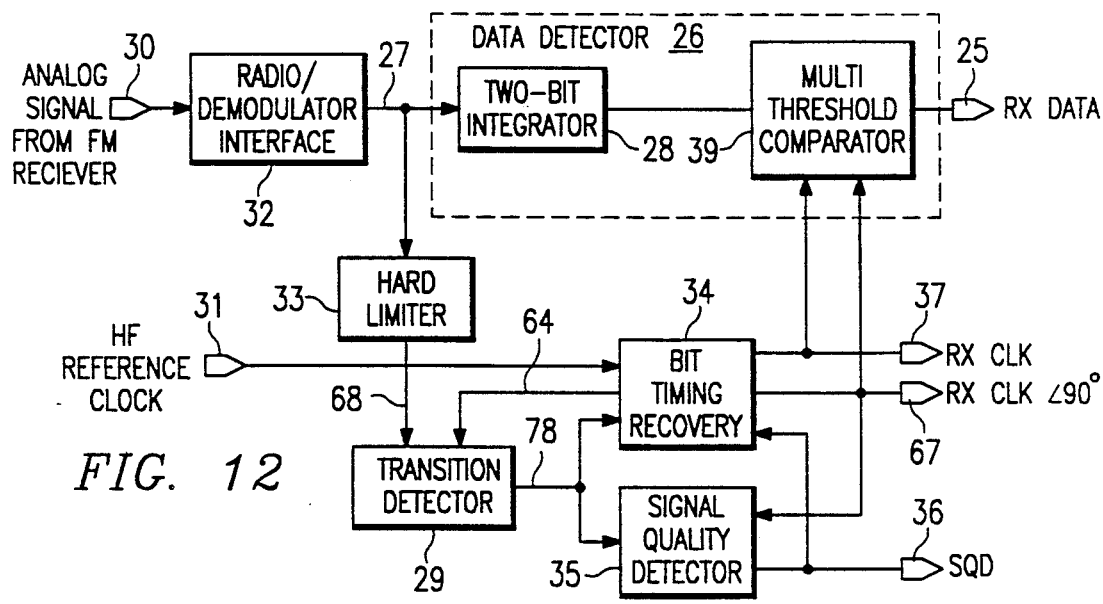
FIG. 12 is a block diagram of the GMSK demodulator as shown in FIG. 4 with an alternate data detector including a two-bit integrator and a multithreshold integrate-and-dump filter.

Referring to FIG. 12, alternatively a multithreshold IDF may be used as the data detector of the demodulator section of the GMSK modem as shown in FIG. 4. As illustrated in FIG. 12, the GMSK modem includes the radio/demodulator interface circuit 32 the hard limiter 33, the transition detector 29, the bit recovery 34 and the signal quality detector 35 all previously described and functioning the GMSK modem of FIG. 12 as explained. The data detector 26 includes a multithreshold integrate-and-dump filter (multithreshold IDF) consisting of the two-bit integrator 28 and a multithreshold comparator 39. As illustrated, the output of the multithreshold comparator 39 is the Rx data on line 25. The two-bit integrator 28 of FIG. 12 is the same integrator as illustrated and described with reference to FIG. 5.

Figure 13:
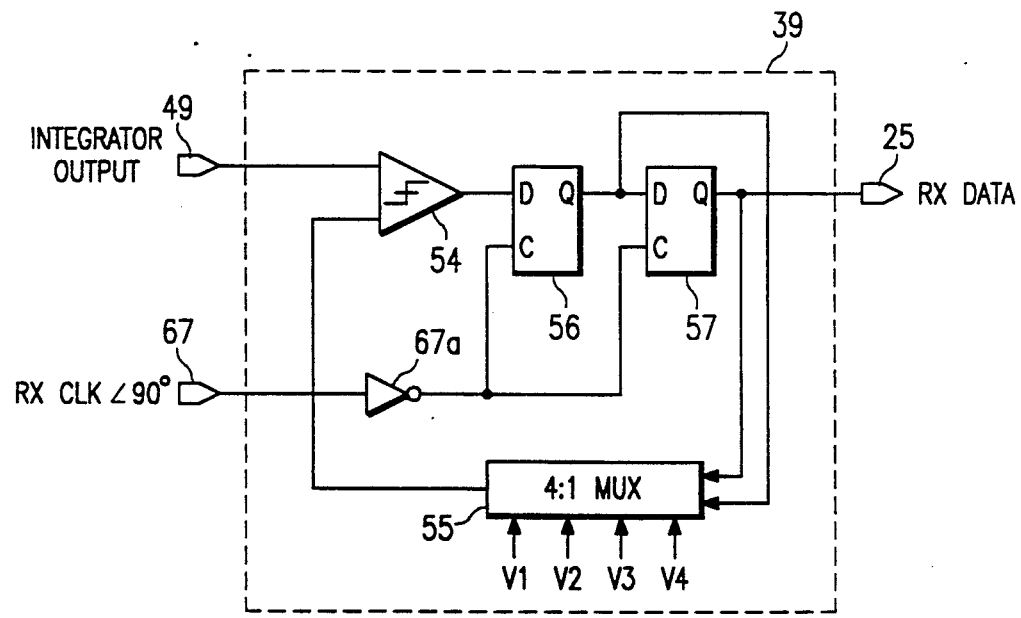
FIG. 13 is a schematic of the comparator section of the multithreshold integrate-and-dump filter of the data detector of FIG. 12.

Referring now to FIG. 13, there is shown a schematic diagram of the multithreshold comparator 39 where the output of the two-bit integrator as illustrated in FIG. 5 is connected to a comparator amplifier 54. The threshold voltage applied to the comparator amplifier 54 is provided by a threshold detector 55 which is identified as a four-to-one multiplexor having threshold voltages V1, V2, V3 and V4 applied thereto. The threshold voltages are adjustable and may be supplied by any suitable circuit means.

The impulse response of a Gaussian premodulation filter extends over several bit periods. To compensate for the effect on the baseband signal of the two previously transmitted and detected data bits, the multithreshold IDF dynamically switches between the threshold voltages V1–V4. The control lines to the threshold selector 55 for operation of the four-to-one multiplexor are connected to the Q outputs of the two D-type flip-flops 6 and 57. The D input of the D-type flip-flop 56 is connected to the output of the comparator amplifier 54. The D-type flip-flops 56 and 57 are serially interconnected such that the Q output of the flip-flop 56 is connected to the D input of the flip-flop 57. The flip-flops 56 and 57 are caught by the inverse of the Rx clock at 90° generated at the output of the inverter amplifier 67a in order to accommodate the time lag induced by the integration of the baseband signal and to make the comparison when the output of the integrators are at full swing. The detected binary values of the prior two Tx data bits, therefore, determine the threshold voltage for the comparator amplifier 54. The Rx data output line 25 is connected to the Q output of the flip-flop 57. Functionally, the GMSK modem of FIGS. 4 and 12 operate as previously described with reference to FIG. 4.

The invention has been described in connection with a preferred embodiment. This description is not intended to limit the scope of the invention to the particular form set forth, but, on the contrary, it is intended to cover such alternatives, modifications, and equivalents as may be included within the spirit and scope of the invention as defined in the appended claims.

We claim:

1. A GMSK modem in a communications system for data transmission, comprising:
   a modulator including:
   a premodulation filter coupled to a data source for filtering the data from said source, said premodulation filter having a Gaussian impulse response and a normalized noised bandwidth $B_t$ between 0.25 and 0.45, and generating a GMSK modulated baseband signal output; and
   means for controlling the gain of said premodulation filter such that an RF frequency signal modulated by the GMSK modulated baseband signal has a modulation index "h" of between 0.5 and 0.7; and
   a demodulator including;
   a data detector including a two-bit integrate-and-dump filter coupled to the analog output signal of an FM receiver; and
   bit timing recovery means including a binary quantized loop coupled between the analog signal output of the FM receiver and the two-bit integrate-and-dump filter a clock signal phase aligned with the data bit transmission of the GMSK modulated baseband signal in the analog output signal of the FM receiver.

2. In a GMSK communications system, the modem according to claim 1 wherein said binary quantized loop comprises a variable-threshold loop filter and a signal quality detector coupled together for selecting the threshold o said loop filter according to the GMSK modulated baseband signal and the relative amount of noise in the analog signal output of the FM receiver.

3. In a GMSK communications system, the modem according to claim 1 wherein said data detector further comprises a multithreshold integrate-and-dump filter coupled to the analog signal output of the FM receiver and having a plurality of threshold voltages, and including means to set the threshold voltage on the basis of the binary value detected by the multithreshold integrate-and-dump filter of a previous bit of data carried by the GMSK modulated baseband signal.

4. In a GMSK communication system as set forth in claim 1 including a bit timing recovery system for generating a phase aligned demodulator clock signal for said demodulator comprising:
   a binary quantized loop coupled to the analog signal output of an FM receiver containing a GMSK modulated base band signal for generating a demodulator clock signal in phase with the data bit transitions in the GMSK modulated baseband signal.

5. In a GMSK communication system, the bit timing recovery system according to claim 4, wherein said binary quantized loop comprises:
   means for generating a demodulator clock signal for the GMSK demodulator;
   means for comparing the phase of the demodulator clock signal with the data bit transitions of the GMSK modulated baseband signal to determine whether the phase of the demodulator clock signal leads or lags the data bit transitions; and
   means coupled to said means for comparing the phase comparator, for advancing or retarding the phase of the demodulator clock signal in accordance with the phase of the demodulator clock signal either leading or lagging the data bit transitions.

6. In a GMSK communication system the bit timing recovery system according to claim 5 wherein said means for comparing further comprises:
   a transition detector for detecting transitions in the analog signal output of the FM receiver across a predetermined threshold voltage;
   means for determining whether the phase of the demodulator clock signal leads or lags said transitions; and
   means for filtering the effects of noise in the analog signal output of the FM receiver by counting to a predetermined threshold number the number of times the phase of the demodulator clock signal leads and lags the transitions before determining whether the phase of the demodulator clock signal leads or lags the data bit transitions in the GMSK modulated baseband signal.

7. In a GMSK communication system as set forth in claim 1 including a signal quality detector for indicating the presence or absence of a high quality baseband signal in the analog output of an FM receiver comprising:
   a hard limiter having a two-level output for detecting data bit transitions in the baseband signal as modulated by digital data in the analog signal output of an FM receiver;
   first means for counting all transitions in the output of the hard limiter; and
   second means for counting transitions in the output of the hard limiter caused by noise in the analog signal output of the FM receiver, said second means counting the transitions in the output occurring while the phase of a clock signal, whose phase is aligned with the data bit transitions in the baseband signal, makes it probable that the transition in the level of the output is due to noise in the analog signal output of the FM receiver.

8. In a GMSK communication system, the signal quality detector according to claim 7 further comprising means coupled to said first and second means for computing from the number of transitions counted by said first and second means when the number of transitions in the output of said hard limiter due to noise in the analog output of the FM receiver exceeds a predetermined percentage of the total number of transitions in the output of the hard limiter.

9. In a GMSK communication system, the signal quality detector according to claim 7 wherein said second means counts the transitions in the output of the hard limiter occurring while the phase of the clock signal is between 90° and 270°.

10. In a GMSK communication system, a multithreshold data bit detector for digital signals comprising:

means for integrating an analog signal output of an FM receiver modulated by digital data to generate an output value;

means for comparing the output value of said means for integrating with a preselected threshold value; and means for selecting one of a plurality of threshold values depending on the value of the predetermined number of previously detected data bits.

11. In a GMSK communication system, the data detection system according to claim 10 further comprising: first and second integrators coupled in parallel to a baseband signal, the period of integration for each integrator being staggered such that the first integrator integrates beginning at a time $t=0$ and the second integrator integrates beginning at $t=T$, where T equals one bit period.

12. In a GMSK communication system, a GMSK demodulator comprising: a two-bit integrate-and-dump filter coupled to a differentially encoded GMSK baseband signal modulated by digital data, said filter including first and second integrators, said first integrator integrating over a period from $t=0$ to $t=2T$, where T is one data bit period, and said second integrator integrating over a period $t=T$ to $t=3T$, and a comparator for comparing the outputs of said first and said second integrator to determine the value of each bit of digital data carried by the GMSK baseband signal.

* * * * *

UNITED STATES PATENT AND TRADEMARK OFFICE
CERTIFICATE OF CORRECTION

PATENT NO. : 5,090,026

DATED : February 18, 1992

INVENTOR(S) : Harold P. Stern, et al.

It is certified that error appears in the above-identified patent and that said Letters Patent is hereby corrected as shown below:

```
Col. 2, line 6, after "index", insert --h--;
Col. 8, line 54, add period after "85";
Col. 10, line 1, change "(SI)" to --(SPI);
Col. 13, line 46, change "o" to --of--;
Col. 13, line 65, change "base band" to --baseband--.
```

Signed and Sealed this

Twenty-first Day of September, 1993

Attest:

BRUCE LEHMAN

Attesting Officer

Commissioner of Patents and Trademarks